United States Patent [19]

Coote et al.

[11] 4,368,974

[45] Jan. 18, 1983

[54] ILLUMINATING SYSTEM FOR PRODUCING PRINTS ON VARIABLE CONTRAST PHOTOSENSITIVE MATERIAL, FILTER STRIP FOR SAID SYSTEM AND LAMPHOUSE COMPRISING THE SAME

[75] Inventors: Jack H. Coote, Rochford; Arthur P. Jenkins, London, both of England

[73] Assignee: Ciba-Geigy AG, Basel, Switzerland

[21] Appl. No.: 258,269

[22] Filed: Apr. 28, 1981

[30] Foreign Application Priority Data

May 2, 1980 [GB] United Kingdom ............... 8014655
Sep. 5, 1980 [GB] United Kingdom ............... 8028727

[51] Int. Cl.³ ..................... G03B 27/72; G03B 27/76
[52] U.S. Cl. ............................................... 355/35
[58] Field of Search .................. 355/35, 38, 71, 77; 350/320, 317; 362/277

[56] References Cited

U.S. PATENT DOCUMENTS

| | | | |
|---|---|---|---|
| 2,734,435 | 2/1956 | Leonardi | 355/71 X |
| 3,089,386 | 5/1963 | Hunt | 350/320 |
| 3,205,767 | 9/1965 | Weber et al. | 355/71 X |
| 3,418,048 | 12/1968 | Veit | 355/38 |
| 3,531,199 | 9/1970 | Burger et al. | 355/71 |
| 3,536,402 | 10/1970 | Aston | 355/35 |
| 3,901,598 | 8/1975 | Vanheerentals | 355/71 |

FOREIGN PATENT DOCUMENTS

| | | | |
|---|---|---|---|
| 936843 | 12/1955 | Fed. Rep. of Germany | 355/71 |
| 2188850 | of 1974 | France. | |
| 2434407 | of 1980 | France. | |
| 564784 | 7/1975 | Switzerland | 350/317 |
| 969811 | 9/1964 | United Kingdom | 355/71 |

*Primary Examiner*—Richard A. Wintercorn
*Attorney, Agent, or Firm*—Harry Falber

[57] ABSTRACT

An elongated two-color light-transmitting filter strip of a light-transmitting material has a first zone of its length which transmits light in a first of two mutually exclusive wavebands, a last zone which transmits light in the second of two mutually exclusive wavebands, and a middle zone of the strip having discrete elements which transmit light in the first of the two mutually exclusive wavebands and discrete elements which transmit light in the second of the two mutually exclusive wavebands, the elements having equal areas and being so arranged that there is a progressive change in the transmission of light in the two mutually exclusive wavebands along the middle part of the strip and being so arranged that there is no single line of demarcation dividing that part of the filter which transmits light only in the first of the two mutually exclusive wavebands from that part of the filter which transmits light only in the second of the two mutually exclusive wavebands. An illuminating system comprising this filter strip and a lamphouse in which the illuminating system and filter strip can be used are likewise described.

16 Claims, 7 Drawing Figures

ILLUMINATING SYSTEM FOR PRODUCING PRINTS ON VARIABLE CONTRAST PHOTOSENSITIVE MATERIAL, FILTER STRIP FOR SAID SYSTEM AND LAMPHOUSE COMPRISING THE SAME

BACKGROUND OF THE INVENTION

The invention relates to an illuminating system for producing a condensed light usable in the production of prints on variable contrast photosensitive material from a negative by exposure of the latter to said condensed light, which system comprises a light source, plate means having an aperture and being placed next to said light source and permitting light from said light source to be directed toward said negative in the form of a light cone, and an elongated two-colour filter strip of light-transmitting material, having a longitudinal axis and a frontal strip face turned toward said light source, and an opposite face; at least one of said frontal and opposite faces thereof bearing three transverse zones adjacent one another and disposed in sequence along said strip axis to constitute two end zones and a middle zone therebetween, a first one of said end zones being a first-colour end zone adapted for transmitting light in a first of two mutually exclusive wavebands, the other end zone being a seond-colour end zone adapted for transmitting light in the second one of said two wavebands, and said middle zone bearing a plurality of discrete first colour elements transmitting light in said first waveband and a plurality of discrete second colour elements which transmit light in said second waveband.

The invention further relates to a two-colour filter strip of the aforesaid type. The novel illuminating system and/or the novel filter strip can be used particularly in a lamphouse for photographic enlargers.

An illuminating system of this type is described in British patent specification No. 2,023,297, in which the two-colour filter strip bears two zones next to one another, along the longitudinal strip axis, which are separated by a sharp transverse junction between the two zones transmitting light in different mutually exclusive wavebands, in particular yellow and magenta.

However, even when, as in FIG. 4a of that GB-PS, there is a middle zone having discrete areas as described hereinbefore, the partial sums of the yellow-transmitting surface areas of the middle zone illuminated through the aperture in the plate means are not progressively increasing, but are alternatingly increasing and again decreasing while the strip is scanned through the said aperture.

Moreover, it has been found that, there is no satisfactory progressive mixing of light, but special light mixing means must be provided.

It is also known to compensate alterations of the effective filter density resulting from adjustment of the filter by corresponding but opposite adjustment of a disphragm. This arrangement employs filters of continuously variable density, which are expensive.

It is also known to obtain a continuously adjustable filter by using a movable filter with filter material cut into a comb-like array of wedge-shaped elements, and a matching comb-like segment which remains in the optical path. The colour density of such a filter may be continuously varied from approximately zero up to the maximum colour density. The disadvantage of this arrangement is, that six colour filter discs are present in the optical path at the same time and that much light is therefore lost. (viz. col. 1 of U.S. Pat. No. 3,418,048).

In U.S. Pat. No. 3,418,048 to Anton Veit, there is disclosed a filter assembly consisting of two filter discs each of which bears three comb-like arrays of wedge-shaped colour filter elements, e.g. of yellow, magenta and cyan colour, which are mutually displaced by 120° and each in part overlaps the two adjacent arrays, while the spaces intermediate the wedge-shaped comb teeth and the center of the filter disc remain colourless, through which center the optical path of unfiltered light extends when the two filter discs are completely superimposed. The discs are arranged to gyrate about the optical axis without rotation about their own axes, thus introducing each peripheral portion in turn of the filter discs into the optical path to vary the filter colour. A maximum filtering effect is achieved when the peripheral portion of one of three filtering zones of one filter disc is superimposed upon the corresponding peripheral portion of the other disc.

This rather complicated known structure serves to vary the colour density of the filter from approximately zero up to the maximum colour density.

But while the loss of light is reduced compared with the last-mentioned earlier adjustable filter arrangement with six colour filters, there is still loss of filtered light and the whole apparatus is complicated and correspondingly expensive.

Similar drawbacks are found in the colour correction filter apparatus of Keith Ashton, described in U.S. Pat. No. 3,536,402 which requires the use of three separate filter discs. Ashton teaches that the light after filtering should be highly diffused in order completely to mix the filtered light with unfiltered light, involving again considerable loss of light.

The interference filter described by Ashton consists of a thin interference film which is so deposited upon a base plate that it forms coated and uncoated areas which are small in relation to the total area of the base plate, the coated (or uncoated) areas being surrounded by uncoated (or coated) areas, the coated areas serving to reflect the undesired wavelengths and transmit substantially all other wavelengths of the exposing light beam of the said apparatus and the uncoated areas serving to transmit the exposing light beam substantially unchanged.

In this way the light transmitted through the interference filter is a mixture of unchanged light transmitted through the uncoated areas and colour corrected light transmitted through the coated areas. The ratio of the total uncoated to coated area of the filter will determine the overall density of the filter and may either be constant throughout the area of the filter or may change progressively through the length of the filter so that the filter may be moved across the exposing light beam for adjustment of its effective density. The coated areas desirably give a heavy or substantially complete suppression of light of the wavelengths that it is desired to suppress.

The configuration of the uncoated and coated areas may be in any form but dots similar to the pattern of a half-tone printed picture are usually quite suitable.

Finally, Robert W. C. Hunt described in U.S. Pat. No. 3,089,386, a filter pair for controlling the spectral composition of a light source, which is made in the form of dye or glass wedges 5 and 6, in which the absorption gradually increases from one end to the other and these wedges can be moved across the light beam from a light source 7 so as to give different degrees of absorption. For example, by attaching to a cyan coloured filter wedge 5 a correcting filter wedge 6 is wedged in the opposite direction, it is possible by careful choice of the colour and density of the constituent wedges to obtain a composite wedge in which only the red absorption varies from one end to the other, the green and blue absorptions remaining constant. Movement of such a composite wedge 5, 6 in the light beam thus enables its red content to be varied independently of its green and blue contents and similar composite wedges can be constructed to provide independent control of the green and blue contents of the beams.

It is further suggested that there is used with each filter-pair, a short compensating wedge-pair which is similar to a section of the light end of each coloured wedge 5 and 6, respectively, but mounted with the wedgings in the opposite direction so that the device does not have to be used out of focus with respect to the final image obtained. The compensating wedges are stationary and are sufficiently large to extend completely across the path of the light beam as defined by an apertured plate 10.

Summing up therefore, in none of the prior art proposals is there described a light filter systemin which movement of the filter past the light source modulates the light passing the filter in two mutually exclusive wavebands in a complementary manner. Thus in none of the prior art proposals is there the need to obviate any sharp transverse junction between two zones transmitting light in different mutually exclusive wavebands. Therefore none of the prior art proposals could be used to solve the problem which is solved in the illuminating system of the present invention.

OBJECTS AND SUMMARY OF THE INVENTION

It is an object of the present invention to provide an illuminating system and colour filter means therefor which make it possible to print variable contrast material using less expensive photographic printing apparatus, and particularly filter means having a much simpler construction than those of the prior art and permitting omission of a light-mixing box or the like mixing means.

It is also an object of this invention to provide two-colour filter means which enables a gradual transition between an area of transmission of a first colour and an area of transmission of a second colour, by which filter means special light-mixing means can be dispensed with without producing areas of different contrast in a processed print.

It is a further object of this invention to provide two colour filter means which permit counteracting the effect, usually resulting from the combination of photographic material with a light source to which the material is exposed, of greater sensitivity to light in one of the two mutually exclusive wavebands than to the other.

Lastly, it is an object of the invention to provide two-colour filter means which can be used in an enlarger which does not have a light-mixing box or the like special bulky light-mixing means.

These objects are attained in accordance with the invention in an illuminating system and a two-colour filter strip therefor, of the initially described type, wherein the illuminating system comprises, on a common central optical axis with the said light source, a condenser assembly comprising a terminal condenser lens in the direction of light flow from the said light source, said apertured plate means are interposed between the light source and the condenser assembly, and the filter strip, the face of which opposite the frontal strip face is turned toward the said terminal condenser lens, is interposed between the said plate means and said terminal condenser lens, and is displaceable along the longitudinal strip axis thereof in a plane perpendicular to the optical axis; the partial sums of surface areas of the said first colour elements in transverse regions of the middle zone illuminated through said aperture diminish progressively in size from a transverse region adjacent the first end zone to a transverse region adjacent said second end zone and are absent in the latter end zone; the partial sums of surface areas of the said second colour elements in transverse regions of said middle zone illuminated through said aperture diminish progressively in size from a transverse region adjacent, the said second end zone to a transverse region of the middle zone adjacent the said first end zone and are absent in the latter end zone, while the sizes of the first colour elements and of the second colour elements in each transverse zone are small enough that light in the two mutually exclusive wavebands transmitted by them is mixed automatically in a sufficient degree for producing prints of a determined contrast.

Preferably, in the illuminating system of the invention, each of the said zones of the two-colour filter strip is larger than the area of the frontal strip surface illuminated by said light cone; and the filter strip is preferably interposed between the plate means and the condenser assembly. While the filter strips can be an interference filter, its production as an absorption filter comprising a transparent support, e.g. of glass, one face of which bears coloured (e.g. yellow and magenta) gelatin coatings is particularly simple and inexpensive.

In contrast to certain prior art filters (e.g. FIG. 1 of U.S. Pat. No. 3,089,386 and FIGS. 2a and 4a of British patent specification No. 2,023,297A), the filter strip according to the invention is free from a single line of demarcation transverse to said longitudinal strip axis dividing that end zone of the filter strip which transmits light in the first of the two mutually exclusive wavebands from that end zone of the filter strip which transmits light in the second of the two mutually exclusive wavebands.

In a preferred embodiment of the two-colour filter strip according to the invention, the surface areas of the discrete first-colour elements are wedge-shaped, each wedge having a broad foot end and an opposite apex, the foot ends of all first colour elements being disposed in the transverse region of said middle zone next adjacent said first end zone and their apices being located in the transverse region of said middle zone next adjacent said second end zone, the surface areas between said wedge-shaped first colour elements being constituted by equally wedge-shaped second colour elements, and the number of wedge-shaped elements counted transversely to the longitudinal strip axis being such that effective mixing of light from the two wavebands is obtained.

The wedge-shaped surface areas of the first-colour and second-colour elements can have lateral edges which are inclined at an acute angle of from about 1° to 20° against the longitudinal strip axis, thereby achieving good mixing of light transmitted by said first-colour elements with light transmitted by said second-colour elements.

The two-colour strip of the present invention can be constituted by two or more pieces of glass or other transparent material joined, but preferably it comprises a single piece of glass or other transparent material forming the three above-mentioned zones, e.g., by gelatin coatings of two different colours.

Most preferably, the two-colour filter strip can consist of a colourless transparent support; and coatings of the first-colour constituting the first colour elements and coatings of a second colour constituting the second-colour elements are borne on one of said strip faces. The second-colour elements can constitute a series of dots the size of which gradually increases from the transverse region of the middle zone next-adjacent the first-colour end zone toward the transverse region of the middle zone next-adjacent the second-colour end zone, while the surface area of the middle zone surrounding the dots bears the first colour, or vice versa.

In another embodiment of the two-colour filter strip according to the invention, the first-colour elements constitute lines transverse to the horizontal strip axis, the thickness of which transverse lines increases gradually from the transverse region of the middle zone next-adjacent the second-colour end zone to the transverse region of the middle zone next-adjacent the first-colour end zone, and the second-colour elements constitute the transverse interspaces between the said transverse lines, which interspaces increase in width gradually from the transverse region of the middle zone next-adjacent the first-colour end zone to the transverse region of the middle zone next-adjacent the second-colour end zone.

According to another aspect of the invention, an elongated two-colour light-transmitting filter strip, a first zone of the length of which transmits light in a first of two mutually exclusive wavebands and a last zone of which transmits light in the second of two mutually exclusive wavebands, has a middle zone intermediate, and next-adjacent each of said first and last zones of said strip, comprising discrete elements which transmit light in the first of the two mutually exclusive wavebands and discrete elements which transmit light in the second of the two mutually exclusive wavebands, the elements having equal areas and being so arranged that there is a progressive change in the transmission of light in the two mutually exclusive wavebands along the middle zone of the strip and being so arranged that the strip is free from any single line of demarcation dividing said first zone of the filter from said last zone of the filter, the filter strip further comprising a colourless transparent support base, and two wedges coated on the support base and overlapping in the middle zone of the filter strip to form together a length of uniform thickness, one of the said wedges transmitting light in the first of two mutually exclusive wavebands and the other wedge transmitting light in the second of two mutually exclusive wavebands, each of the two wedges having attached to their thick ends a length of coating of uniform thickness which constitute the first and the last zone of the filter strip on the support base, respectively.

The two said wedges may be coated on the same side of the support base and physically as well as optically overlap or one may be coated on one side of the support base and the other on the other side of the support base so that there is an optical overlap when light is transmitted therethrough.

When the two-colour filter strip of the present invention is to be used for printing onto variable contrast material sensitive to blue and to green light, one portion of the two-colour filter strip used passes blue light but not green light and the other portion of the two-colour filter strip passes green light and not blue light.

Although such variable-contrast paper is not generally sensitive to red light, it is an advantage to provide red light simultaneously with the blue and/or green light. In this way the visibility of the image on an easel carrying the variable contrast material is enhanced and composition and focussing of the picture are facilitated. In practice the preferred two-colour filter strip for use with variable-contrast material is therefore a filter strip one portion of which is yellow (minus blue) and the other portion of which is magenta (minus green), the middle portion having areas which are yellow and areas which are magenta arranged in the manner hereinbefore set forth.

Therefore, in a preferred embodiment of the present invention there is provided a two-colour filter as described in which the first of the two mutually exclusive wavebands is the blue region of the spectrum and the second of the two mutually exclusive wavebands is the green region of the spectrum. Preferably, the two colours of the two-colour filter strip are magenta (red and blue) and yellow (red and green).

There can be associated, preferably, with the yellow elements of this yellow and magenta filter strip light attenuating means which cuts down the amount of light passed by one of the elements of the filter so that when the filter is used in the exposure of variable-contrast print material prints of equal visual density are obtained by exposures of equal duration whatever part of the filter is being used during the exposure of the print material.

All the light attenuating means described in British patent specification No. 2,023,297 A may be used in association with the two-colour filter strip of the present invention but if the area pattern chosen for the middle part of the filter strip is a series of graduated dots or lines of differing thickness it would be difficult to prepare a neutral density filter having a similar area pattern. However, if a saw-toothed pattern of areas is chosen or wedges are employed a neutral density filter of the same pattern is relatively easy to prepare.

Instead of using a neutral density filter or a mask to reduce the amount of light transmitted in one of the two mutually exclusive wavebands a filter strip can be used which has some absorption in the band of electromagnetic radiation which it should transmit. For example, when a yellow filter is used it may have significant green light absorption. Such a colour is referred to as a dirty colour and is preferred in the yellow elements of the filter strip according to the invention.

Thus, in one end position of the filter strip the full amount of magenta (red and blue) light is transmitted through one end zone, whilst in another end position of the filter strip a restricted amount of yellow (green and red) light is transmitted. At intermediate positions of the filter strip in the middle zone, different proportions of yellow and magenta light are transmitted, but in all of these positions the amount of yellow light is restricted compared with the amount which would be transmitted if a dirty yellow had not been used.

The two-colour filter strip of the present invention may also be used in a photographic system to produce prints of variable contrast, using conventional photographic material of fixed contrast, preferably medium contrast, and a transparency, the image of which comprises a dye the optical absorption of which is selective within the wavelength band to which the printing material is sensitive. Thus, for example, the transparency may comprise an image in varying densities of a yellow dye which absorbs violet light heavily, but transmits green light relatively freely. If a print be made from such a transparency using only violet light, a print of high contrast will be produced. If the print be made using blue light, a print of lower contrast will result. Intermediate contrasts will result from the use of appropriate mixtures of violet and blue light.

According to yet another aspect, the invention provides a lamphouse adapted for use with an enlarger head in the production of prints on variable contrast material in combination with a monochrome negative, which lamphouse comprises a two-colour filter strip of the invention as described hereinbefore, the two-colour filter strip being movable in relation to the light source and monochrome negative so that in one position the light passing the filter is predominantly in one of the said wavebands and in a second position the light passing the filter is predominantly in the other of the wavebands, whilst in intermediate positions a varying mixture of light in the two wavebands is passed through the filter strip.

Preferably, the lamphouse has a tungsten filament opal envelope light source, and this is associated with a fixed aperture plate, which prevents light from the light source passing to the monochrome negative without passing through the filter strip; through the aperture of this plate, light from the light source is directed by a straight or reflected path to the monochrome negative present in the photographic enlarger to which the lamphouse is attached. The two-colour filter strip of the present invention can be movably held on one side of the fixed aperture plate so that different parts of the filter strap can be present in the light path of the lamphouse.

Preferably, there is associated with the two-colour filter strip used in this lamphouse light attenuating means of the type described hereinbefore to cut down the amount of light passed in that one of the said two mutually exclusive wavebands to which the combination of light source and photosensitive material to be exposed is more sensitive. Thereby, prints of equal visual density are obtained by exposures of an equal duration whatever the position of the said two-colour filter strip in relation to the said light source and monochrome negative.

The time required to expose correctly the photosensitive material to light passing a filter depends on the colour of light emitted by the light source, on the colour sensitivity of the photosensitive material and on the optical density of the filter.

Preferably, the enlarger associated with the lamphouse comprises a condenser lens assembly, a monochrome negative holder, an objective lens and an easel for the photosensitive print material.

Most preferably the two-colour filter strip is placed as close as possible to the light source without being so close as to be damaged by heat. However, the two-colour filter strips may be placed close to the objective lens, usefully beneath the objective lens or between the elements of the objective lens at or near the nodal point.

The lamphouse in which the two-colour filter strip of the present invention is used may comprise a light-mixing chamber but the main advantage of the two-colour filter strip is that it can be used in a relatively inexpensive enlarger which does not have a light-mixing box.

Similarly the light source may be a quartz halogen lamp but in this case preferably the two-colour filter strip is a dichroic filter to prevent light and heat damage to the filter itself.

Preferably, the two-colour filter strip is so mounted in the lamphouse that a manual control alters the position of the two-colour filter strip to enable a preset contrast grade to be obtained. Thus in most variable-contrast material an all green light exposure produces a very low contrast or soft print whilst an all blue light produces a very high contrast or hard print. Thus all green light corresponds to a contrast of 0 in most contrast grading systems whilst all blue light corresponds to a contrast grade of 4. Intermediate contrast grades are obtained by mixtures of green and blue light, grade 1 comprising more green than blue light, whilst grade 3 comprises more blue than green light.

BRIEF DESCRIPTION OF THE DRAWINGS

Further objects and details of the invention will become apparent from the following description thereof in connection with the accompanying drawings in which.

DETAILED DESCRIPTION OF THE EMBODIMENTS SHOWN IN THE DRAWINGS

Figure 1:
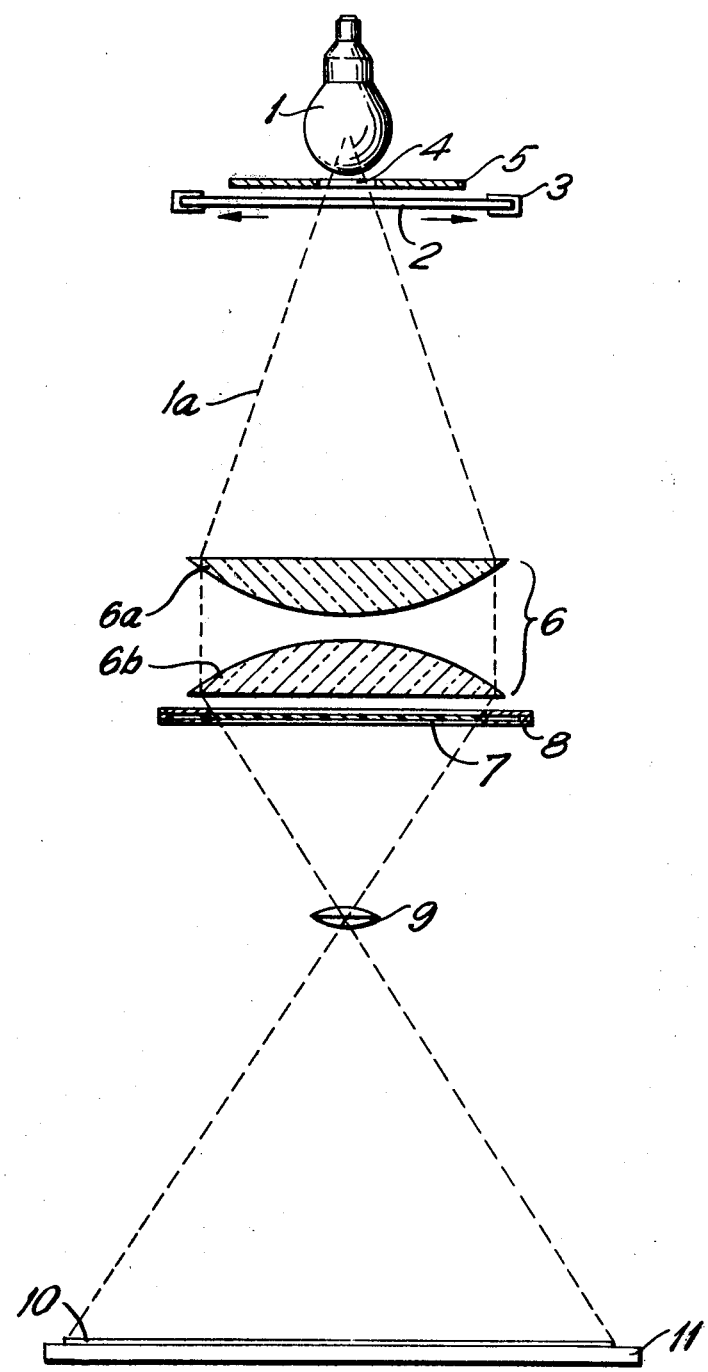
FIG. 1 is a side view of a lamphouse comprising an illuminating system and two-colour filter strip according to the present invention.

In the lamphouse shown in FIG. 1, there is used a tungsten filament opal envelope lamp 1 having beneath it a two-colour filter strip 2 according to the present invention. The filter strip 2 is held in a mount 3 which can be moved to the left or to the right so that any desired part of the filter strip can be illuminated through the aperture 4 in the aperture plate 5.

Below the aperture plate 5 and filter strip 2 in the path of the light which is indicated by dotted lines is a two part condenser lens assembly 6 with a first lens 6a and a second, terminal lens 6b. Below the condenser lens assembly 6 in the path of the light is a monochrome negative 7 in a negative holder 8.

Below the negative holder 8 is an objective lens 9, and below the latter in the path of the light is a piece of variable contrast photographic printing paper 10 on an easel 11.

Light from the light source passes through the aperture 4 and the light cone 1a leaving the latter passes through the two-colour filter strip 2 and the condenser lens assembly 6 to the negative 7. The light passing the negative is then focussed by the objective lens 9 on to the printing paper 10.

The printing paper 10 is variable contrast material which is sensitive to green light and to blue light, but exposure to green light only yields a low contrast print whilst exposure to blue only yields a high contrast print.

The filter strip 2 could be placed underneath the objective lens 9 and in this case no aperture plate 5 will be required.

Figure 2:
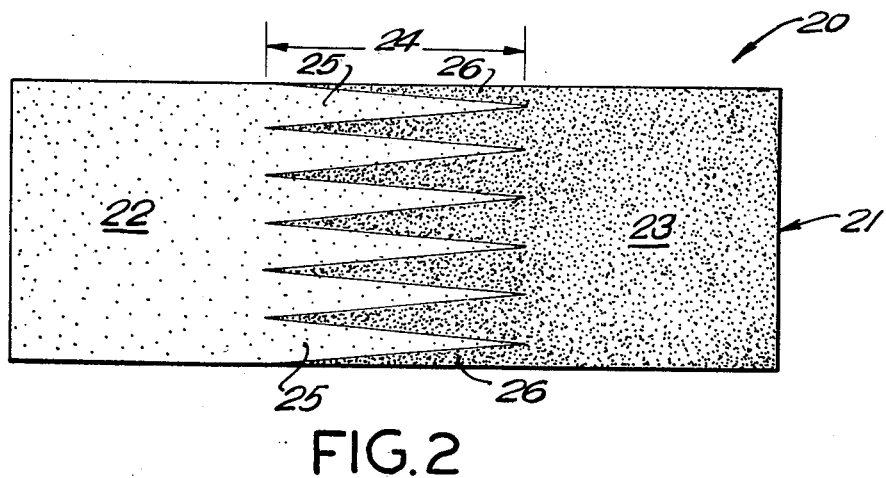
FIG. 2 is a front view of a preferred embodiment of the two-colour filter strip of the present invention used in FIG. 1.

In FIG. 2 a filter strip 20 is shown in top plan view, and comprises a support base 21 which consists of a strip of transparent material such as film or glass. A first end zone 22 (on the left, dotted) is yellow and absorbs blue light. A third zone 23 (on the right, shaded) is magenta and absorbs green light. The middle zone 24 intermediate end zones 22 and 23 carries a saw-toothed pattern of interleaved areas of yellow 25 and magenta 26. The yellow is dirty yellow, i.e. a yellow which has some green light absorption.

Figure 3A:
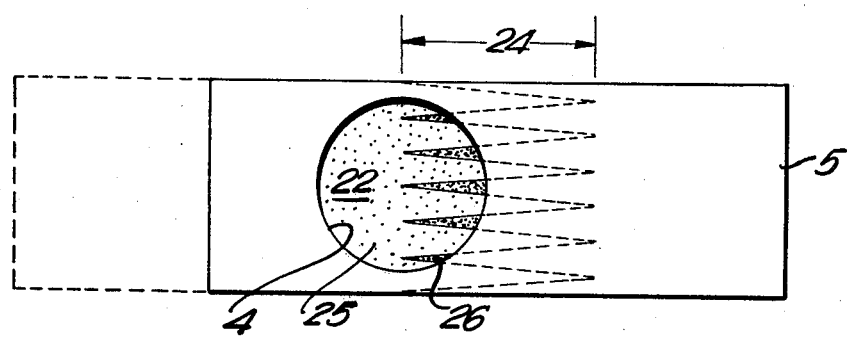
FIGS. 3a and 3b show the filter strip embodiment of FIG. 2 in two positions behind a fixed aperture plate.
Figure 3B:
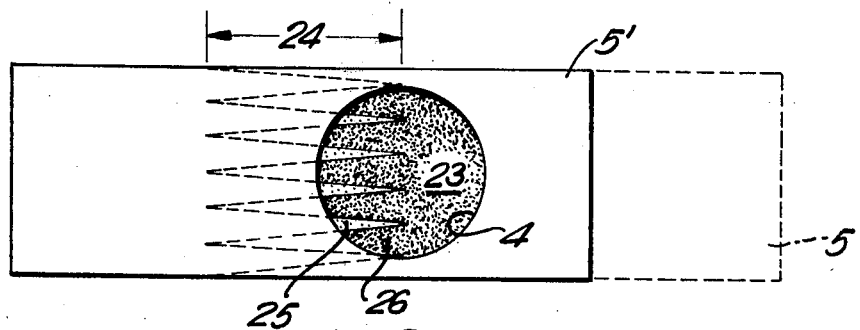

In FIGS. 3a and 3b the circular aperture 4 in the apertured plate 5 has been superposed on the two-colour filter strip 20 of FIG. 2 to indicate two positions of the filter strip in the illuminating system of FIG. 1.

In FIG. 3a most of the light which passes through the aperture 4 passes through the dirty yellow saw-tooth or wedge portions 25 of the filter strip 20 and thus has been attenuated.

In FIG. 3b most of the light which passes through the aperture 4 passes through the saw-tooth magenta portions 26 of the filter and thus the light has been attenuated to a much lesser degree.

An exposure when the filter strip is in the position of FIG. 3a would yield a low contrast print as mostly yellow light is employed, whilst an exposure when the filter strip 20 is in the position of FIG. 3b would yield a much higher contrast print as mostly magenta light is employed.

However, an exposure for an equal duration in either position of FIG. 3a or of FIG. 3b will yield prints of equal visual density although, as just stated, the contrasts of the two prints will differ. Prints of very low contrast will be obtained when the aperture 4 covers only the yellow end zone 22 of the filter strip 20 and prints of high contrast will be obtained when the aperture 4 covers only the magenta end zone 23 of the filter strip 20, but for equal duration of exposure times equal density prints will be obtained whatever the position of the filter strip 20 in relation to the aperture 4.

Furthermore, the contrast of the prints in the position of FIGS. 3a and 3b is substantially even over the whole of the print, while the contrast of the two prints in both positions would be uneven, if a distinct transverse line of demarcation between the areas of different contrast were visible on the filter strip.

Figure 4:
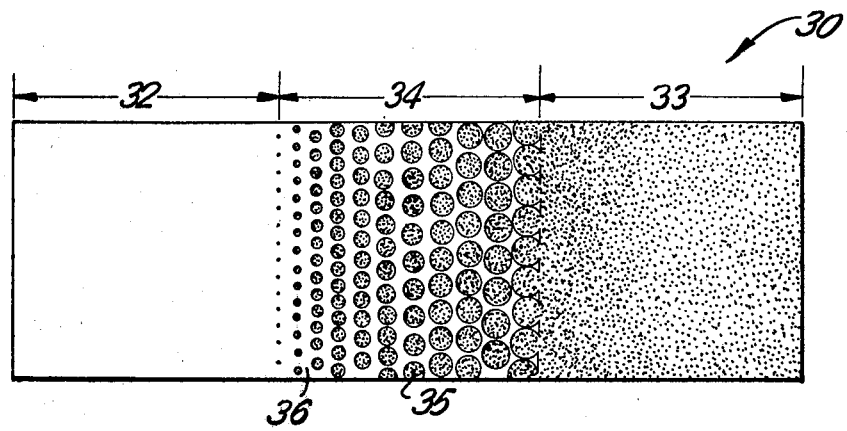
FIG. 4 is a two-colour filter strip according to the present invention wherein the middle part of the filter strip has graduated dot areas of different light transmission properties.

FIG. 4 illustrates a two-colour filter strip 30 having two end zones 32 and 33 at opposite ends and a middle zone 34 therebetween bearing a pattern of graduated dirty yellow dot areas 35 and a surrounding magenta background 36, or vice-versa magenta dots and yellow background, which patterns can be used instead of the saw-tooth pattern.

Figure 5:
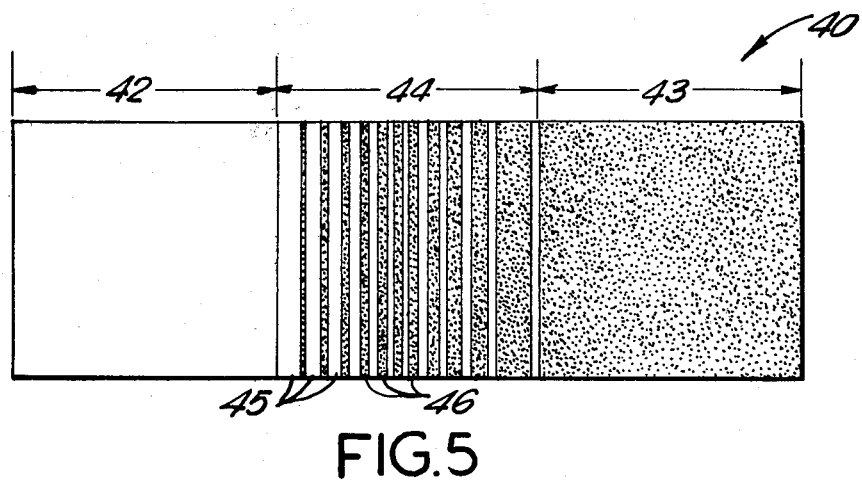
FIG. 5 is a two-colour filter strip according to the present invention wherein the middle part of the filter strip has lines of graduated width of different light transmission properties.

FIG. 5 illustrates a two-colour filter strip 40 having in a middle zone 44 a pattern of graduated dirty yellow line areas 45 and, in the interstices thereof, magenta line areas 46 which also can be used instead of the sawtooth pattern of FIG. 2.

Figure 6:
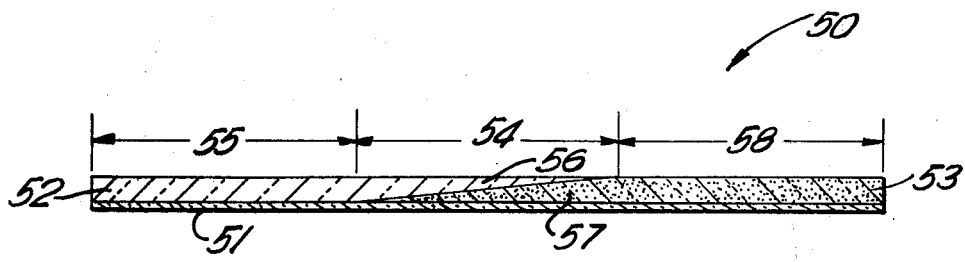
FIG. 6 is a two-wedge filter strip of the present invention.

FIG. 6 is a side elevation of a two-colour filter strip 50. In this embodiment there is coated on a cellulose triacetate strip 51 a yellow dyed gelatin wedge 52 and a magenta dyed gelatin wedge 53. The wedge 52 comprises a length 55 of uniform thickness and a wedge length 56 which overlaps the wedge length 57 of the wedge 53, which latter wedge also comprises a length 58 of uniform length. In the middle zone 54, the overlapping wedge lengths 56 and 57 have a similar graduated light mixing effect as the sawtooth pattern of two-colour filter 20 in FIG. 2.

What is claimed is:

1. An illuminating system for producing a condensed light usable in the production of prints on variable contrast photosensitive material from a negative by exposure of the latter to said condensed light, which system comprises, on a common central optical axis, a light source, a condenser assembly comprising a terminal condenser lens in the direction of light flow from said light source, plate means having an aperture and being interposed between said light source and said condenser assembly and permitting light from said light source to be directed toward said condenser assembly in the form of a light cone, and an elongated two-color filter strip of light-transmitting material, having a longitudinal axis, a frontal strip face turned toward said light source, and an opposite strip face turned toward said terminal condenser lens, said filter strip being interposed between said plate means and said terminal condenser lens, and being displaceable along said longitudinal strip axis thereof in a plane perpendicular to said optical axis, said filter strip having at least one of said frontal and opposite faces thereof bearing three transverse zones adjacent one another and disposed in sequence along said strip axis to constitute two end zones and a middle zone therebetween, a first one of said end zones being a first-colour end zone adapted for transmitting light in a first of two mutually exclusive wavebands, the other end zone being a second-colour end zone adapted for transmitting light in the second one of said two wavebands, and said middle zone bearing a plurality of discrete first colour elements transmitting light in said first waveband and a plurality of discrete second colour elements which transmit light in said second waveband, the sum of the surface areas of said first-colour elements being equal with the sum of the surface areas of said second-colour elements, in said middle zone, while the partial sums of surface areas of said first colour elements in transverse regions of said middle zone, illuminated through said aperture, diminish progressively in size from a transverse region adjacent said first end zone to a transverse region adjacent said second end zone and are absent in the latter end zone and the partial sums of surface areas of said second colour elements in transverse regions of said middle zone, illuminated through said aperture, diminish progressively in size from a transverse region adjacent said second end zone to a transverse region of said middle zone adjacent said first end zone and are absent in the latter end zone;

the sizes of said first-colour elements and said second-colour elements in each transverse zone being such that light in the two mutually exclusive wavebands transmitted by them is mixed automatically in a sufficient degree for producing prints of a determined contrast.

2. The illuminating system of claim 1, wherein each of said zones is larger than the area of said frontal strip surface illuminated by said light cone.

3. The illuminating system of claim 1, wherein said filter strip is interposed between said plate means and said condenser assembly.

4. An elongated two-colour light-transmitting filter strip having a longitudinal strip axis, a frontal strip face adapted for being turned toward a light source and an opposite strip face, said filter strip having at least one of said frontal and opposite faces thereof bearing three transverse zones adjacent one another and disposed in sequence along said strip axis to constitute two end zones and a middle zone therebetween, a first one of said end zones being a first-colour end zone adapted for transmitting light in a first of two mutually exclusive wavebands, the other end zone being a second-colour end zone adapted for transmitting light in the second one of said two wavebands, and said middle zone bearing a plurality of discrete first colour elements transmitting light in said first waveband and a plurality of discrete second colour elements which transmit light in said second waveband, the sum of the surface areas of said first-colour elements being equal with the sum of the surface areas of said second-colour elements, while the partial sums of surface areas of said first colour elements in transverse regions of said middle zone diminish progressively in size from a transverse region adjacent said first end zone to a transverse region adjacent said second end zone and are absent in the latter and the partial sums of surface areas of said second colour elements in transverse regions of said middle zone diminish progressively in size from a transverse region adjacent said second end zone to a transverse region of said middle zone adjacent said first end zone and are absent in the latter end zone, the sizes of said first colour elements and said second colour elements in each transverse zone being such relative to the surface area of said middle zone that light in the two mutually exclusive wavebands transmitted by them is mixed automatically in a sufficient degree for producing prints of a determined contrast, said filter strip being free from a single line of demarcation transverse to said longitudinal strip axis dividing that end zone of the filter strip which transmits light in the first of the two mutually exclusive wavebands from that end zone of the filter strip which transmits light in the second of the two mutually exclusive wavebands.

5. The two-colour filter strip of claim 4, wherein the surface areas of said discrete first-colour elements are wedge-shaped, each wedge having a broad foot end and an opposite apex, the foot ends of all first-colour elements being disposed in the transverse region of said middle zone next-adjacent said first end zone and their apices being located in the transverse region of said middle zone next-adjacent said second end zone, the surface areas between said wedge-shaped first-colour elements being constituted by equally wedge-shaped second-colour elements, and the number of wedge-shaped elements counted transversely to the longitudinal strip axis being such that effective mixing of light from the two wavebands is obtained.

6. The two-colour filter strip of claim 5, wherein the wedge-shaped surface areas of the first-colour and second-colour elements have lateral edges which are inclined at an acute angle of from about 1° to 20° against the longitudinal strip axis, thereby achieving mixing of light transmitted by said first-colour elements with light transmitted by said second-colour elements.

7. The two-colour filter strip of claim 5 or 6, wherein said filter-strip consists of a colourless transparent support; and coatings of said first-colour constituting said first-colour elements and coatings of a second colour constituting said second-colour elements are borne on one of said strip faces.

8. The two-colour filter strip of claim 4, wherein said second-colour elements constitute a series of dots the size of which gradually increases from said transverse region of said middle zone next-adjacent said first-colour end zone toward the transverse region of said middle zone next adjacent said second-colour end zone, while the surface area of said middle zone surrounding said dots bears said first colour, or viceversa.

9. The two-colour filter strip of claim 4, wherein said first-colour elements constitute lines transverse to the horizontal strip axis, the thickness of which transverse lines increases gradually from the transverse region of said middle zone next-adjacent said second-colour end zone to the transverse region of said middle zone next adjacent said first-colour end zone, and wherein said second-colour elements constitute the transverse interspaces between said transverse lines which interspaces increase in width gradually from the transverse region of said middle zone next-adjacent said first-colour end zone to the transverse region of said middle zone next adjacent said second-colour end zone.

10. The two-colour filter strip of claim 4, wherein the first of the two mutually exclusive wavebands is the blue region of the spectrum and the second of the two mutually exclusive wavebands is the green region of the spectrum.

11. The two-colour filter strip of claim 10, wherein the two colours are yellow and magenta.

12. The two-colour filter strip of claim 4, further comprising light-attenuating means associated with said filter strip to reduce the amount of light transmitted in one of the two mutually exclusive wavebands.

13. The two-colour filter strip of claim 11, which further comprises light-attenuating means associated with the yellow elements of the filter strip.

14. The two-colour filter strip of claim 12, wherein said yellow elements are of a dirty yellow colour.

15. An elongated two-colour light-transmitting filter strip, a first zone of the length of which transmits light in a first of two mutually exclusive wavebands, a last zone of which transmits light in the second of two mutually exclusive wavebands and a middle zone, intermediate, and next-adjacent each of said first and last zones of said strip, comprising a first element which transmits light in the first of the two mutually exclusive wavebands and a second element which transmits light in the second of the two mutually exclusive wavebands, the elements having equal areas and being so arranged that there is a progressive change in the transmission of light in the two mutually exclusive wavebands along the middle zone of the strip and being so arranged that the strip is free from any single line of demarcation dividing said first zone of the filter from said last zone of the filter, said filter strip further comprising a colourless transparent support base and two wedges coated on said base and overlapping in said middle zone of the filter strip to form together a length of uniform thickness, one of said wedges constituting said first light-transmitting element and the other wedge constituting said second light-transmitting element, each of the two wedges having attached to their thick ends a length of coating of uniform thickness which constitute the first and the last zone of the filter strip on said support base.

16. A lamphouse adapted for use with an enlarger head in the production of prints on variable contrast material in combination with a monochrome negative, which lamphouse comprises a two-colour filter strip as claimed in claim 4, said two-colour filter strip being movable in relation to the light source and monochrome negative so that in one position the light passing the filter is predominantly in one of said wavebands and in a second position the light passing the filter is predominantly in the other of said wavebands, whilst in intermediate positions a varying mixture of light in the two said wavebands is passed through the filter strip.

* * * * *